US011835545B2

(12) United States Patent
McLeod et al.

(10) Patent No.: US 11,835,545 B2
(45) Date of Patent: Dec. 5, 2023

(54) SYSTEMS, METHOD AND COMPUTER-ACCESSIBLE MEDIUM FOR PROVIDING BALANCED ASYMMETRIC INTERFEROMETRY FOR VIBRATIONALLY ISOLATED OPTICAL SCANNING PROBE(S)

(71) Applicant: The Trustees of Columbia University in the City of New York, New York, NY (US)

(72) Inventors: Alexander Swinton McLeod, New York, NY (US); Lin Xiong, Bronx, NY (US); Shuai Zhang, New York, NY (US); Dimitri N. Basov, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 115 days.

(21) Appl. No.: 17/149,236

(22) Filed: Jan. 14, 2021

(65) Prior Publication Data
US 2021/0215737 A1    Jul. 15, 2021

Related U.S. Application Data

(60) Provisional application No. 62/960,927, filed on Jan. 14, 2020.

(51) Int. Cl.
*G01Q 20/02*    (2010.01)
*G01Q 30/18*    (2010.01)
*G02B 21/00*    (2006.01)
*G01B 9/02*    (2022.01)
*G01Q 60/24*    (2010.01)

(52) U.S. Cl.
CPC .............. *G01Q 20/02* (2013.01); *G01B 9/02* (2013.01); *G01Q 30/18* (2013.01); *G02B 21/0032* (2013.01); *G01Q 60/24* (2013.01); *Y10S 33/04* (2013.01)

(58) Field of Classification Search
CPC ........ G01Q 20/02; G01Q 30/18; G01Q 60/24; G01B 9/02; G02B 21/0032; Y10S 33/04
See application file for complete search history.

(56) References Cited

U.S. PATENT DOCUMENTS

2011/0167525 A1* 7/2011 Humphris .......... G01B 11/0608
850/33
2020/0333245 A1* 10/2020 Mohseni .............. A61B 5/4064

OTHER PUBLICATIONS

Ocelic, N., Huber, A. & Hillenbrand, R. "Pseudoheterodyne detection for background-free near-field spectroscopy." Appl. Phys. Lett. 89, (2006).
Post, K.W., McLeod, A.S., Hepting, M. et al. Coexisting first- and second-order electronic phase transitions in a correlated oxide. Nature Phys 14, 1056-1061 (2018) doi:10.1038/s41567-018-0201-1.
F. Foroughi et al., "A micro-SQUID with dispersive readout for magnetic scanning microscopy," Applied Physics Letters vol. 112 / Issue 25, Jun. 2018
Y. Aso et al., "Active vibration isolation using a suspension point interferometer," Journal of Physics, vol. 32, pp. 451-456, 2006.
JWG Tyrrell., et al., "Development of a combined interference microscope objective and scanning probe microscope," Review of Scientific Instruments, vol. 75 / Issue 4, pp. 1120, Jan. 2004
GX Ni., et al., "Fundamental limits to graphene plasmonics," Nature, vol. 557, pp. 530-533, May 2018.
Rok L., "Measurements of Surface Properties in the Nano- and Microscale using optical, mechanical, and scanning probes," National Conference on Nanotechnology 116, 2009.
NL Schneider et al., "Optical probe of quantum shot-noise reduction at a single-atom contact," Physical Review Letters vol. 105, pp. 026601, Jul. 2010.
H. Kwang et al., "Scanning optical probe microscopy with submircometer resolution using an organic photodetector," Applied Physics Letters, vol. 93 / Issue 3, pp. 033311, Jul. 2008.
B. Bhushan et al,, "Scanning Probe Microscopy—Principle of Operation, Instrumentation, and Probes," Nanotribology and Nanomechanics. Springer Berlin, Heidelberg, pp. 37-110.
T. Gyselings et al., "Strong improvement in optical signal regeneration and noise reduction through asymmetric biasing of Mach-Zehnder interferometric all optical wavelength converters," Integrated Optics & Optical Fibre Communications, vol. 5, Sep. 1997.

* cited by examiner

*Primary Examiner* — Nicole M Ippolito
(74) *Attorney, Agent, or Firm* — Hunton Andrews Kurth LLP

(57) ABSTRACT

An exemplary apparatus can provide radiation to a sample (s), which can include, for example, a radiation source arrangement configured to provide radiation, a beam splitter configured to split the radiation into (i) a first radiation, and (ii) a second radiation. An optical element can also be provided which, in operation, can, e.g., (a) receive the first radiation and the second radiation, (b) reflect the first radiation as a reference radiation, (c) provide the second radiation as illumination for the sample(s), (d) receive a resultant radiation from the sample(s) that can be based on the illumination from the second radiation, and (e) provide the reference radiation and the resultant radiation to be detected and used for interferometric imaging or spectroscopy.

25 Claims, 14 Drawing Sheets

Figure 3

Results

| Scheme Name | Samp. arm Isolated? | Ref. arm Isolated? | Beam separation | Signal-to-noise | RMS Phase noise (degree) |
|---|---|---|---|---|---|
| Rigid | No | No | 0.4" | 333 | 2.9 |
| Unbalanced | Yes | No | 0.4" | 12 | 106 |
| Balanced | Yes | Yes | 0.4" | 129 | 5.5 |
| Balanced | Yes | Yes | 0.8" | 96 | 8.7 |

Samp. arm = Interferometer sampling arm
Ref. arm = Interferometer reference arm

Measurement condition:
Path length: 21 inch
Demodulate at 1Ω with 20ms time constants.

Maximum possible detectible noise

1. Approaching Rigid scheme performance
2. Main source of excess noise is rotation of isolation platform, which can be reduced by decreasing beam separation

Figure 7

| Nano-optical SPM system | RMS nano-optical phase noise (degrees) |
|---|---|
| NeaSNOM (Neaspec GmbH) [1] | 0.2 |
| Published unbalanced scheme [2] (home-built cryo-SNOM) | 15 |
| Unbalanced scheme (test SPM) | 106 |
| Balanced scheme (test SPM) | 5.5 |

Nano-optical amplitude S

Nano-optical phase φ

SYSTEMS, METHOD AND COMPUTER-ACCESSIBLE MEDIUM FOR PROVIDING BALANCED ASYMMETRIC INTERFEROMETRY FOR VIBRATIONALLY ISOLATED OPTICAL SCANNING PROBE(S)

CROSS-REFERENCE TO RELATED APPLICATION(S)

This application relates to and claims priority from U.S. Patent Application No. 62/960,927, filed on Jan. 14, 2020, the entire disclosure of which is incorporated herein by reference.

STATEMENT REGARDING FEDERALLY SPONSORED RESEARCH

This invention was made with government support under Grant Nos. DE-SC0019443 and DE-SC0018218, awarded by the Department of Energy, and N00014-18-1-2722, awarded by the Office of Naval Research. The government has certain rights in the invention.

FIELD OF THE DISCLOSURE

The present disclosure relates generally to interferometry, and more specifically, to exemplary embodiments of systems, methods and computer-accessible medium for providing a balanced asymmetric interferometry for vibrationally isolated optical scanning probe(s).

BACKGROUND INFORMATION

The advanced pace of nanotechnology demands novel probes that are capable of resolving micrometer and submicrometer scale devices and physical phenomena. An optical scanning probe microscope incorporated into an asymmetric Michelson interferometer provides an increasingly popular and commercially relevant means to detect and interrogate the optical behaviors of solids relevant for applications in nanotechnology. This asymmetric interferometer scheme facilitates a detection of both the amplitude and phase of the optical response of samples with deeply sub-micrometer spatial resolution afforded by the scanning probe. However, the detection performance of these scanning probes deteriorates rapidly in mechanically and acoustically unstable measurement environments, especially when samples of interest are studied in environmentally controlled conditions, such as at cryogenic temperatures or under ultra-high vacuum. For example, a scanning probe microscope can be effectively isolated from unstable mechanical conditions of the measurement environment using conventional means like active or passive vibration isolation. However, these isolation efforts can further deteriorate the fidelity of optical interferometric detection of optical scanning probes by adding mechanical instability into the "sampling" arm of the interferometer. This renders optical detection of the sample difficult or impossible in mechanically isolated optical scanning probes.

Thus, it may be beneficial to provide exemplary embodiments of systems, methods and computer-accessible medium for providing a balanced asymmetric interferometry for vibrationally isolated optical scanning probe(s), which can overcome at least some of the deficiencies described herein above.

SUMMARY OF EXEMPLARY EMBODIMENTS

To that end, an apparatus for providing radiation to a sample(s) according to an exemplary embodiment of the present disclosure can be provided which can include, for example, a radiation source arrangement configured to provide radiation, a beam splitter configured to split the radiation into (i) a first radiation, and (ii) a second radiation, and an optical element which, in operation, can receive the first radiation and the second radiation, reflect the first radiation as a reference radiation, provide the second radiation as illumination for the sample(s), receive a resultant radiation from the sample(s) that can be based on the illumination from the second radiation, and provide the reference radiation and the resultant radiation to be detected and used for interferometric imaging or spectroscopy.

A variable path length retro-reflector can be included, which can be configured to receive the first radiation, vary the optical phase of the first radiation, and provide the first radiation to the optical element. The optical element can include an objective lens. The optical element can include a concave focusing mirror. The first and second radiations are delivered collinearly at a distance that is less than about 2 centimeters from one another when the first radiation and the second radiation reach the optical element. The beam splitter and the optical element can be provided at a distance that can be less than about 5 feet apart from one another. The optical element can have (i) a diameter focal aperture of about 1 cm and (ii) a diameter reference aperture of about 1 cm. A radiation detector(s) can be configured to receive the reference radiation and the resultant radiation as an interfered radiation, and generate an image(s) or a spectrograph(s) based on the interfered radiation.

In some exemplary embodiments of the present disclosure, an optical chopper can be provided, which can be configured to modulate the second radiation. The optical chopper can be configured to modulate the second radiation at a speed of at least 200 Hz. The radiation detector(s) can be configured to register the second radiation at a time constant of about 60 ms. A scanning probe can be provided, and the optical element can be located on the scanning probe. The optical element can be and/or include a dual-function objective. The dual-function objective can be a gold-coated off-axis parabolic mirror. A measurement chamber can be provided, and the optical element can be mounted on the measurement chamber.

According to further exemplary embodiments of the present disclosure, an isolation platform can be provided, and the optical element can be mounted on the isolation platform. The isolation platform can be suspended from a further platform using a plurality of springs. The exemplary apparatus can be mechanically fixed to an optical table supported by at least four vibration isolation legs. The vibration isolation legs can be and/or include pneumatic vibration isolation legs.

An exemplary method for generating an image(s) of a sample(s) can include, for example, providing a source radiation, splitting the source radiation into a first radiation and a second radiation, reflecting the first radiation as a reference radiation using an optical element, providing the second radiation to the sample(s) using the optical element, receiving, using the optical element, a resultant radiation from the sample(s) that can be based on the second radiation, and generating the image(s) or spectrograph based on an interference between the reference radiation and the resultant radiation.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 3 is an exemplary table showing exemplary results using the exemplary interferometer according to an exemplary embodiment of the present disclosure;

FIG. 7 is an exemplary table comparing operation of an exemplary nano-optical scanning probe in the exemplary interferometer to prior optical scanning probes according to an exemplary embodiment of the present disclosure;

Figure 1:
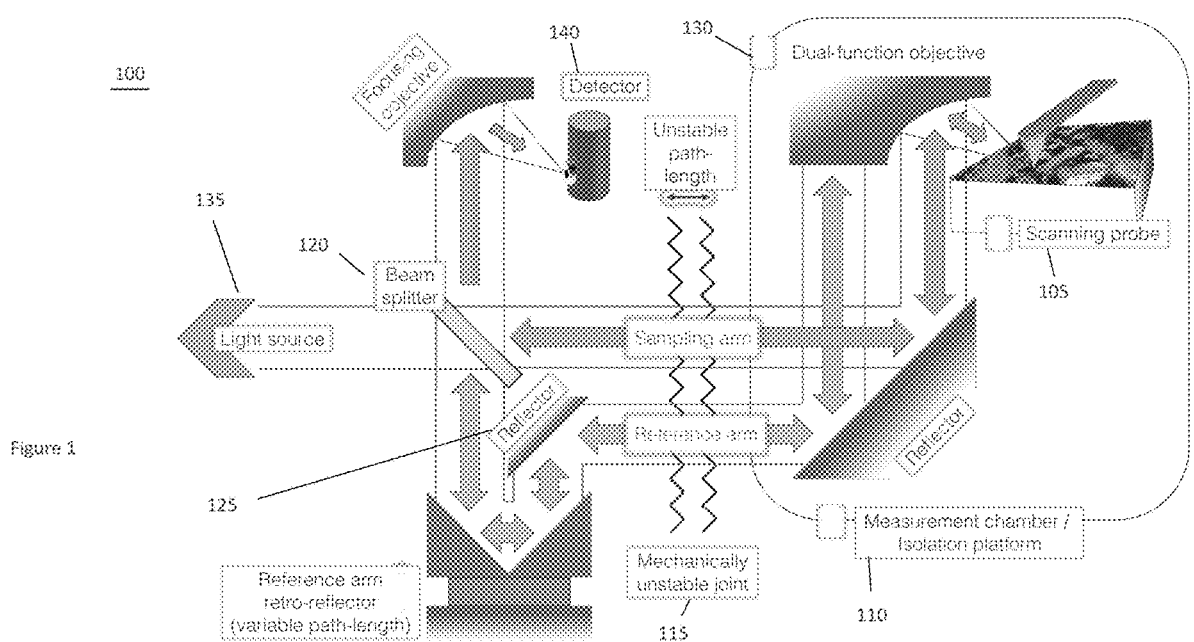
FIG. 1 is an exemplary diagram of the exemplary interferometry apparatus according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

FIG. 1 shows an exemplary diagram of the exemplary interferometry apparatus according to an exemplary embodiment of the present disclosure. The exemplary interferometer apparatus can provide for stable interferometric detection of relatively small signals from an optical scanning probe which can conduct measurements under demanding conditions. The exemplary interferometer apparatus can locate both the "sampling" and "reference" optical arms of the interferometer onto the scanning probe itself (e.g., element 105), regardless of whether it is used in noisy ambient conditions, isolated from the external environment on an isolation platform, within a chamber under environmental control, or operating at cryogenic temperature (e.g., element 110). Any influence of mechanical instabilities on the interferometer arms (e.g., element 115) can be "balanced" and rendered meaningless for the sensitive detection of amplitude and phase responses by the microscope.

The exemplary interferometer apparatus can utilize a beam splitter (e.g., element 120) and variable path-length retroreflector (e.g., element 125) for modulating the phase of the optical beam in the reference arm before its delivery to the scanning probe, coupled with an exemplary Dual-Function Objective (e.g., element 130) on the scanning probe that can be charged with both retro-reflecting the reference beam and focusing the "sampling" beam onto the scanning probe. The dual-function objective 130 can be a gold-coated off-axis parabolic mirror. The effective focal length, diameter of the focal aperture, and the diameter of the reference aperture can all be varied, but in certain scenarios can all be about 1 cm (plus or minus 10%). The distance between collinear radiations associated with reference and sampling arms can be varied, and can be in an exemplary range of from a few inches to several feet away from one another. Light or other electro-magnetic radiation can be provided by a light source 135 and can be detected using detector 140. Beam separation can be as little as about 2 cm (plus or minus 10%). Light source 135, beam splitter 120, retro-reflector 125, and detector 140 can be included on a common mechanically rigid frame (e.g., mounted to a common base-plate or optical breadboard/table).

Compared to prior asymmetric Michelson configurations, the exemplary interferometer apparatus, according to the exemplary embodiment of the present disclosure, can reduce the detection noise by more than an order of magnitude when utilized on a scanning probe platform compatible with complete vibration isolation of the scanning probe from a mechanically noisy measurement environment. Thus, the exemplary interferometer apparatus can be utilized in optical scanning probe microscopes that can be configured with multiplicative interferometric optical detection of very small "sampling" signals, which are now being deployed into challenging measurement environments. The exemplary interferometer apparatus can also facilitate non-traditional sample conditions as well as a reconfiguration of existing optical scanning probe microscopes to further enhance their interferometric detection fidelity that can be otherwise compromised through unavoidable mechanical instabilities of the interferometer.

The exemplary system, method and computer-accessible medium providing an exemplary balanced-interferometry can improve the phase stability in mechanically isolated optical scanning probes by a factor of approximately 20 (e.g., plus or minus 10%), approaching the performance of instrument configurations based on a mechanically rigid optical scanning probe without any mechanical isolation from the measurement environment. This can be achieved, for example, by minimizing the beam separation between the reference and sampling radiations, and by reducing rotational mechanical instabilities of the dual-function objective optic. The exemplary interferometer apparatus can provide a root mean square ("RMS") noise of less than 5° in the phase of optical detection at a sampling radiation wavelength of 10 microns. Additionally, the optical path can be reduced in order to reduce optical detection noise. For example, the path length between beam splitter 120 and dual focusing objective 130 can be reduced to about 10 inches (e.g., plus or minus 10%).

Figure 2:
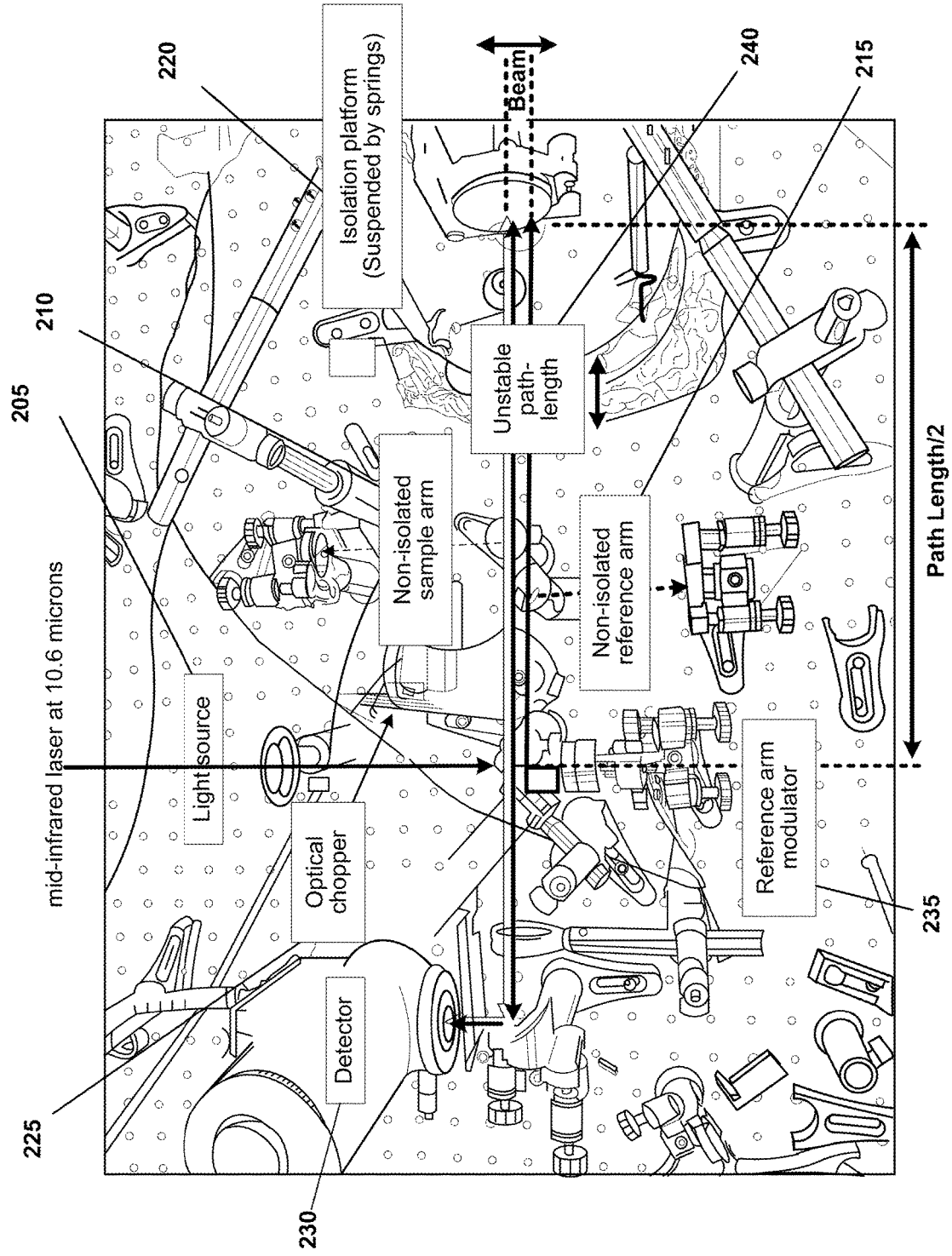
FIG. 2 is an exemplary image of an exemplary measurement configuration/setup according to an exemplary embodiment of the present disclosure.
Figure 4:
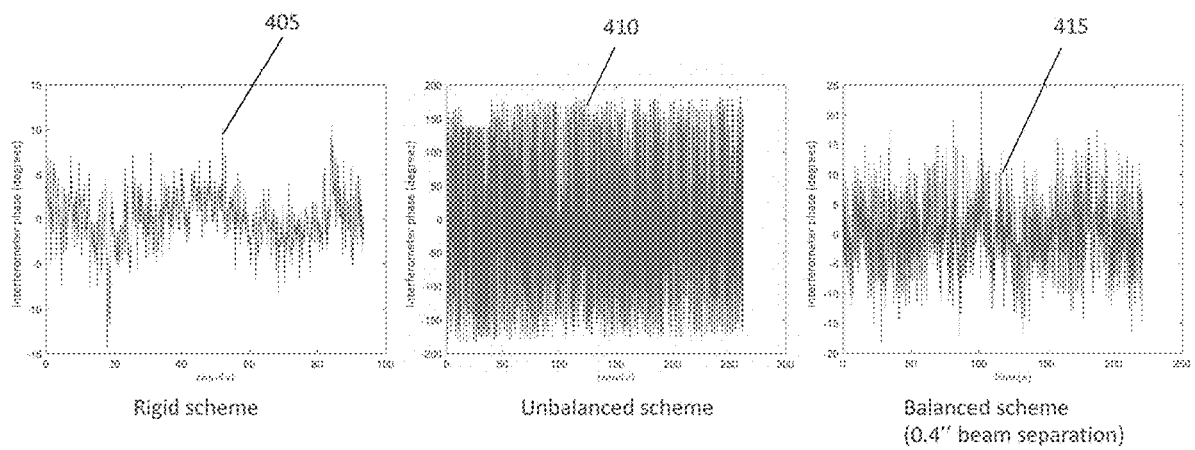
FIG. 4 is a set of exemplary graphs illustrating exemplary results obtained using the exemplary interferometer according to an exemplary embodiment of the present disclosure.
Figure 5:
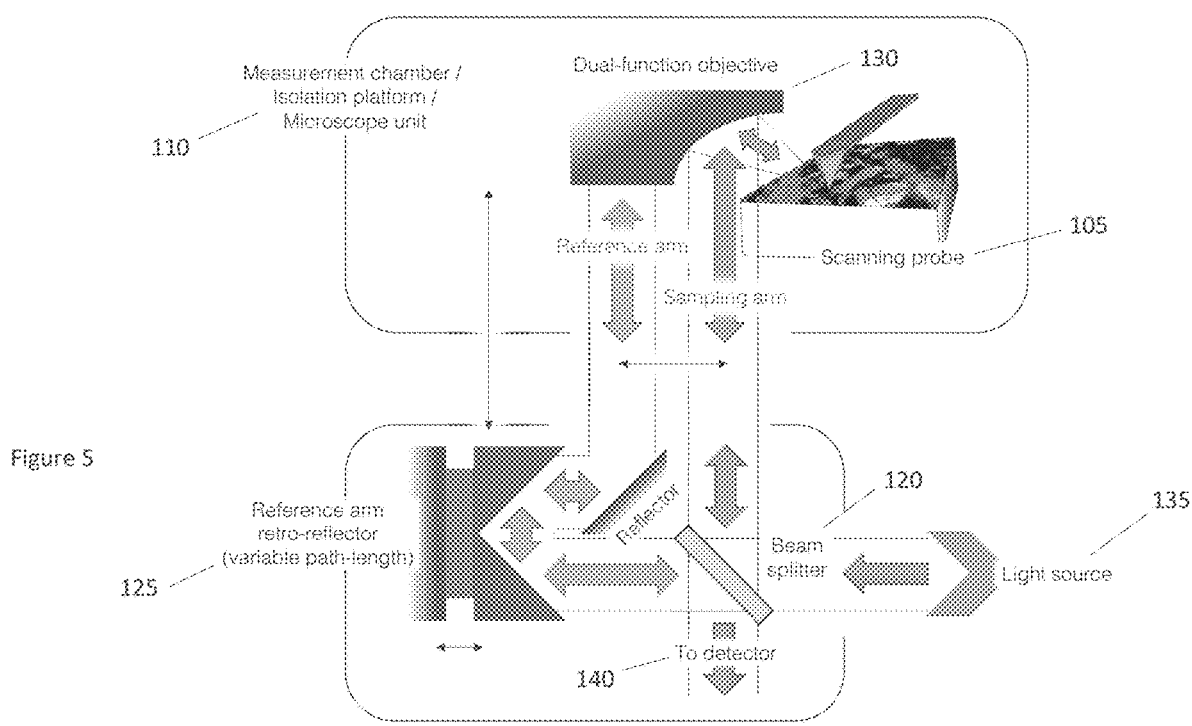
FIG. 5 is an exemplary diagram of the exemplary interferometry apparatus according to another exemplary embodiment of the present disclosure.
Figure 6:
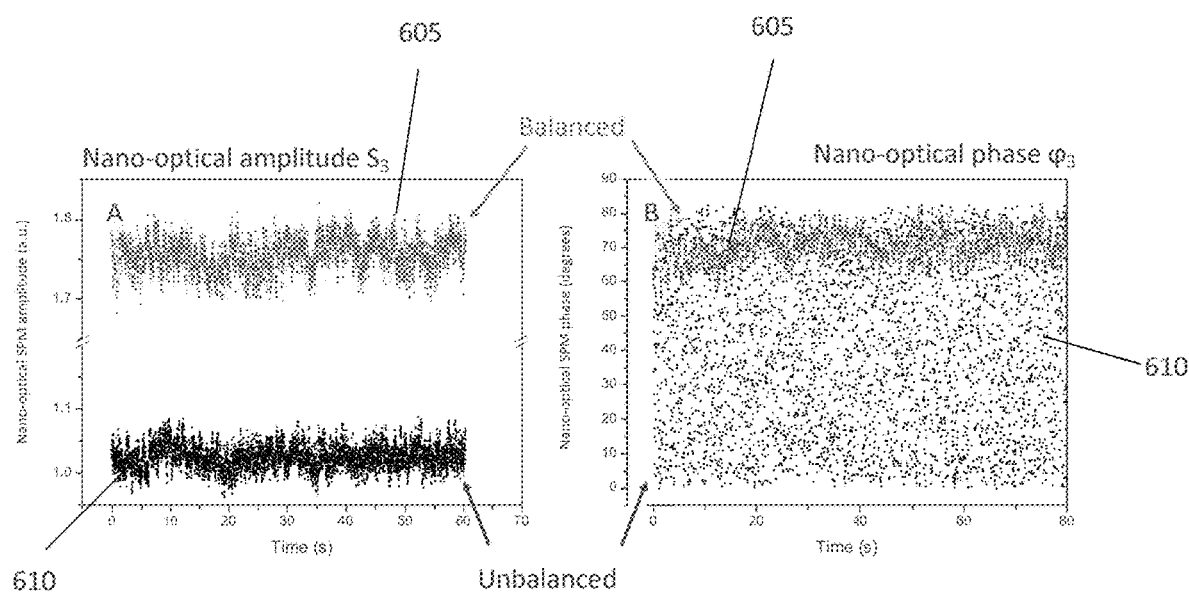
FIG. 6 is a set of exemplary graphs illustrating a performance comparison of an exemplary optical scanning probe microscope implementing two reference geometries according to an exemplary embodiment of the present disclosure.

FIG. 2 shows an exemplary image of an exemplary measurement setup according to an exemplary embodiment of the present disclosure. FIG. 3 illustrates an exemplary table showing exemplary results using the exemplary interferometer apparatus according to an exemplary embodiment of the present disclosure. FIG. 4 shows a set of exemplary graphs illustrating results obtained using the exemplary interferometer apparatus according to an exemplary embodiment of the present disclosure. FIG. 5 shows an exemplary table comparing the exemplary interferometer apparatus to prior optical scanning probes according to an exemplary embodiment of the present disclosure. FIG. 6 illustrates an exemplary diagram of the exemplary interferometry apparatus according to another exemplary embodiment of the present disclosure. FIG. 7 shows a set of exemplary graphs and a table illustrating the comparison between two reference geometries according to an exemplary embodiment of the present disclosure. FIGS. 8 and 9 illustrate a set of exemplary images produced using the exemplary interferometry apparatus according to an exemplary embodiment of the present disclosure. Details of the drawings described herein above shall be further discussed below.

FIG. 3 illustrates an exemplary table showing exemplary results using the exemplary interferometer apparatus using the exemplary test configuration shown in FIG. 2. In the "rigid" example, most or all optical components associated with the sampling and reference arms of the interferometer can be mechanically fixed to an optical table supported by four pneumatic vibration isolation legs, providing the interferometer apparatus an overall modest passive vibration isolation against mechanical disturbances of the environment. This examplary embodiment can utilize a light source 205, with the mechanically fixed optical elements in the "non-isolated" sample arm 210 and a reference arm 215 paths, as shown in FIG. 2. In the "unstable" exemplary embodiment, the sampling arm of the interferometer can be located on measurement chamber/isolation platform 110 shown in FIG. 1 suspended by three soft springs (e.g., an isolation platform 220 shown in FIG. 2), while the reference arm remains non-isolated. In the "balanced" exemplary embodiment of the present disclosure, the reference arm can also be located on measurement chamber/isolation platform 110. In most and/or all the exemplary configurations, the sampling radiation can be modulated e.g., ("chopped") by an optical chopper 225 at a speed of several hundred Hz (e.g., at least 200 Hz), and a radiation "signal" monitored at this frequency can be registered at the detector 230 with a time constant of about 60 microservice (plus or minus 10%). This signal can include the interferometric product of the reference and sampling radiations, and the variable noise level in this signal can quantify optical instability of the interferometer. Two metrics of interferometer performance can be obtained from the signal acquired in each of these examples in order to compare them, and to demonstrate the efficacy of the exemplary interferometer arrangement. This variable noise level in the signal can establish the "signal-to-noise" metric, which is illustrated in FIG. 3, and the "RMS phase noise" can be extracted directly from this metric to identify noise in the relative optical phase of the reference and sampling radiations. As shown in FIG. 3, the rigid example can produce an RMS phase noise of 2.9 degrees, which can be regarded as minimum "baseline" noise associated with optical elements utilized in the exemplary test configuration. In the unbalanced example, the RMS phase noise can exceed the maximum detectable value (e.g., 106 degrees) for the detection mode utilized, which can indicate an instability in interferometer path lengths exceeding the 10.6 micron wavelength of light utilized for the test. The detected RMS phase noise for the balanced example can be reduced to 8.7 degrees for sampling and reference radiation beam paths separated by 0.8 inches and can be reduced further to 5.5 degrees when the beam paths are separated by 0.4 inches.

The exemplary configuration of the apparatus shown in FIG. 2 includes a reference arm modulator 235 and a representative unstable path length 240. The exemplary reference arm modulator 235 can include a retro-reflecting mirror (e.g., retroreflective mirror 125 shown in FIG. 1) mounted to a piezoelectric actuator. This reference arm configuration can facilitate the placement of the mirror parallel to the incoming and reflected radiations by a distance equal to several free-space wavelengths of the radiation, thereby modulating the phase of the reference radiation by a controllable reference angle spanning more than 360 degrees. The exemplary unstable path length 240 can include a propagation distance for both sample and reference radiations to a flat mirror mounted to a vibrationally isolated platform (e.g., isolation platform 220). The flat mirror on isolation platform 220 can be non-rigidly suspended from four springs to emulate the mechanical behavior of a similarly mounted microscope. During operation, unstable path length 240 can vary by a distance as large as several free-space wavelengths of the incoming radiation.

The exemplary results shown in FIG. 3 demonstrate that the exemplary embodiments of the balanced interferometry arrangement/apparatus described herein can reduce phase noise from the vibrationally isolated sampling arm of a reference arm by more than an order of magnitude, and that the reduction efficiency can be determined in part by the lateral separation of reference and sampling radiations delivered to the vibrationally isolated sample, or more generally, the microscope/sample chamber. FIG. 4 shows exemplary line-traces 405, 410, and 415 of the optical phase of the detected signal acquired over several hundreds of seconds in the rigid, unbalanced, and balanced examples of the exemplary test interferometer. FIG. 5 shows an exemplary diagram of the exemplary interferometry apparatus according to another exemplary embodiment of the present disclosure in which an optical scanning probe 105 is placed on a vibration isolated platform 110 at the sampling arm of the interferometer. FIG. 6 shows line-traces of radiation signals (e.g., "nano-optical signals") for exemplary balanced configurations 605 and exemplary unbalanced configurations 610 scattered from the optical scanning probe implemented in an exemplary test example according to the exemplary configuration shown in FIG. 5; the exemplary scanning probe can be an atomic force microscope operated in non-contact (e.g., "tapping") feedback over the surface of a gold sample and the nano-optical signal can be monitored at the $3^{rd}$ harmonic of the scanning probe tapping frequency (e.g., 250 kHz), from which the nano-optical amplitude (S3) and nano-optical phase ($\phi_3$) signals can be obtained. (See e.g., Reference 1).

Figure 8A:
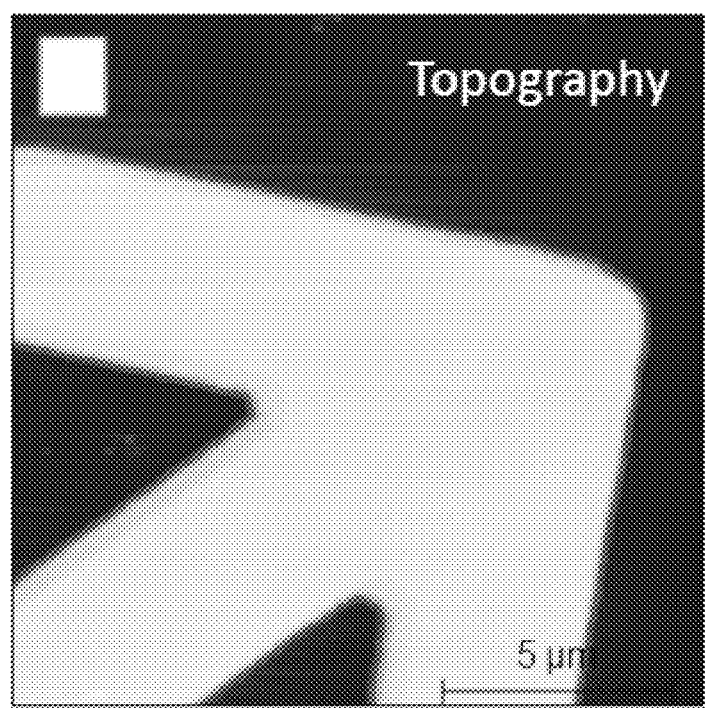
FIGS. 8A-8E and 9A-9F are exemplary images produced using the exemplary interferometry apparatus according to an exemplary embodiment of the present disclosure.
Figures 8B, 8C:
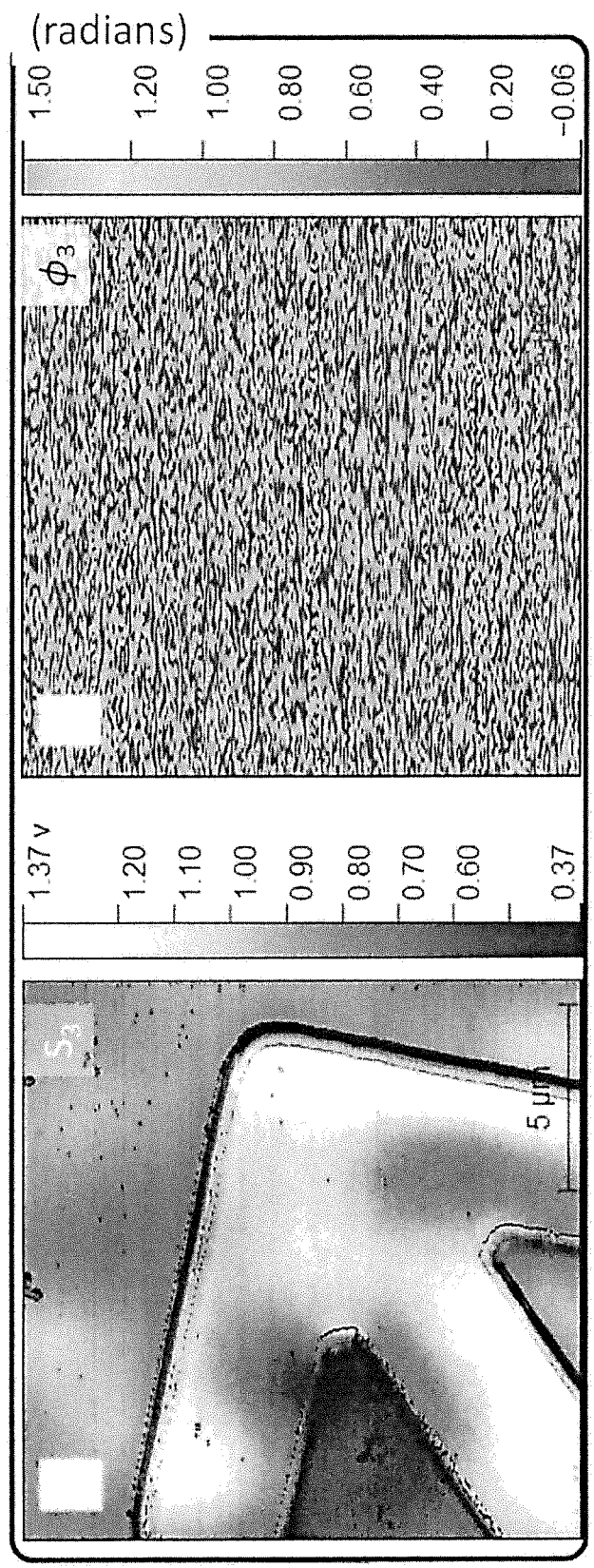
Figures 8D, 8E:
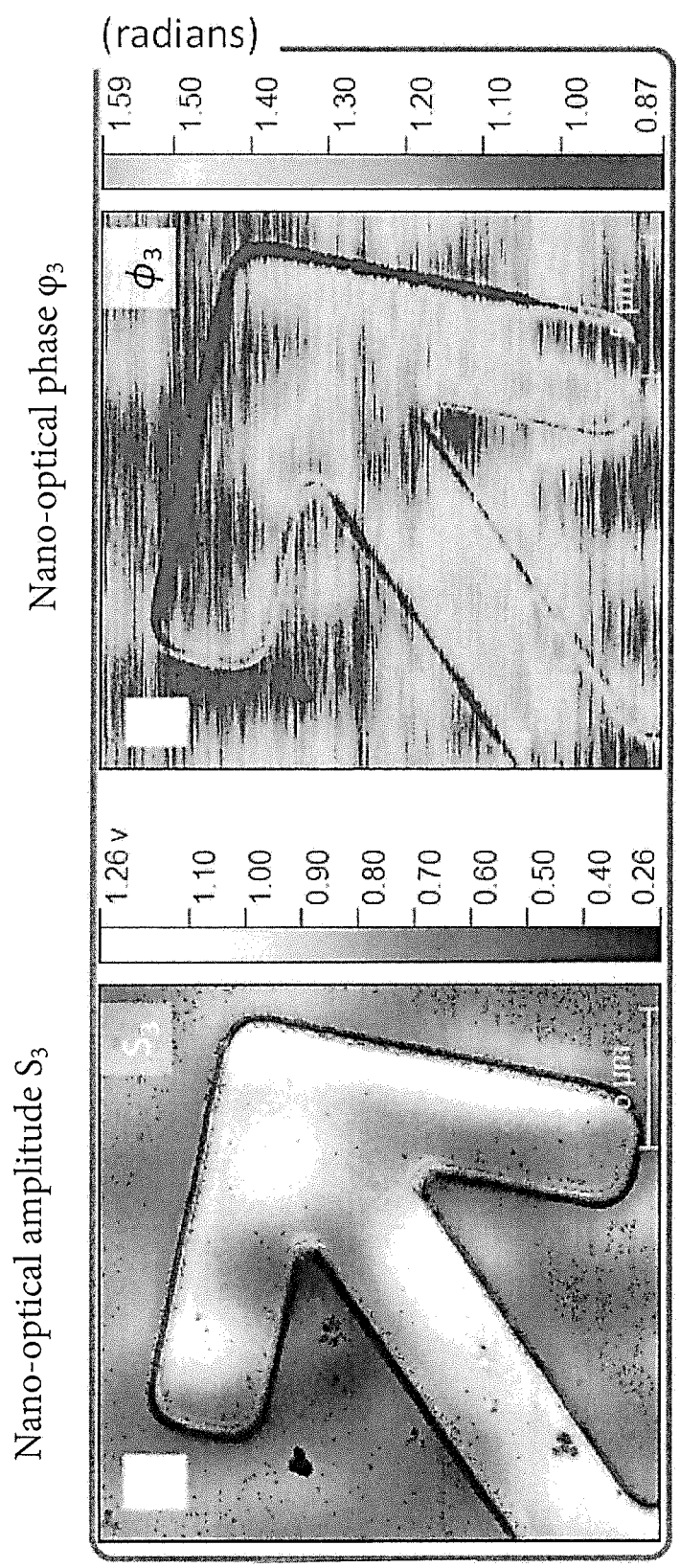
Figures 9A, 9B, 9C:
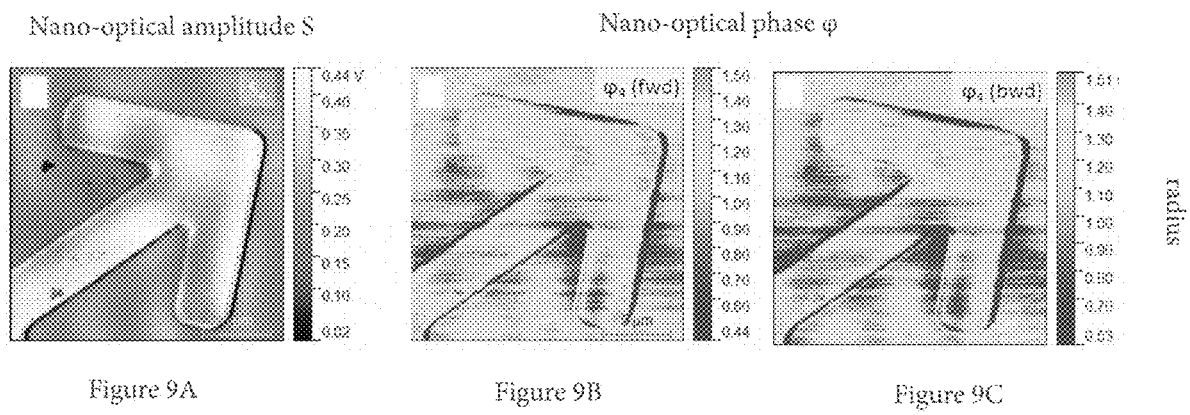
Figure 9D:
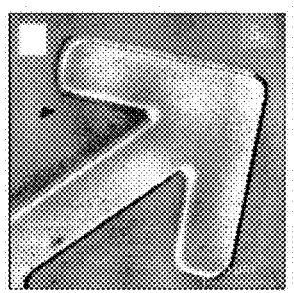
Figure 9E:
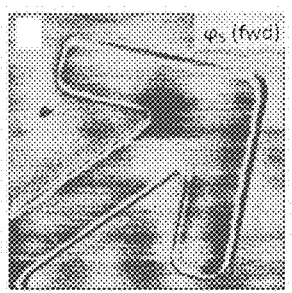
Figure 9F:
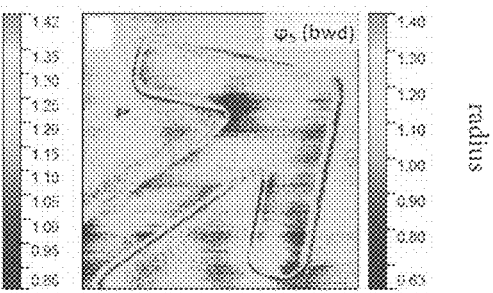

These exemplary signals (e.g., balanced signals 605 and unbalanced signals 610) can be associated with unbalanced and balanced configurations of the interferometer. FIG. 7 is an exemplary table comparing the RMS nano-optical phase stability afforded by an exemplary scanning probe microscope ("SPM") incorporated into the exemplary test interferometer in an unbalanced example of the interferometer, and in an exemplary implementation of the balanced example of the interferometer, against the published performance of state-of-the-art optical scanning probes. These state-of-the-art optical scanning probes include a recently reported home-built low temperature optical scanning probe microscope equipped with a vibration-isolated platform for the sample, and implemented in an unbalanced interferometry scheme. FIGS. 8A-8E show representative exemplary nanometer-resolved infrared images of the amplitude signal $S_3$ and the nano-optical phase signal $\varphi_3$ recorded from a lithographically defined gold structure on a silicon substrate using an exemplary implementation of an optical scanning probe microscope on a vibration-isolated platform incorporated into the unbalanced interferometer configurations (e.g., FIGS. 8B and 8D) and balanced interferometer configurations (e.g., FIGS. 8C and 8D) associated with FIGS. 5-7. FIG. 8A shows the scanning probe topography of the structure obtained in the atomic force microscope modality of the exemplary scanning probe microscope. As illustrated in the comparison of FIGS. 8C and 8E, an exemplary implementation of the balanced interferometry scheme facilitates an acquisition of nano-resolved optical phase contrasts that would otherwise be rendered inscrutable by relative phase noise introduced through mechanical instabilities of a vibrationally isolated scanning probe microscope incorporated into an unbalanced optical interferometer.

FIGS. 9A-9F show additional exemplary nanometer-resolved infrared images of the amplitude signals $S_4$ and $S_5$ and the nano-optical phase signals $\varphi_4$ and $\varphi_5$ cps obtained by monitoring the radiation signal collected by the detector at the $4^{th}$ and $5^{th}$ harmonics of the scanning probe tapping frequency, according to an exemplary pseudoheterodyne procedure enabled in the exemplary interferometer configuration. (See, e.g., Reference 1). Exemplary images of nano-optical phase are shown for forward ("fwd") and backward ("bwd") raster-scans of the scanning probe.

The radiation beams can be delivered collinearly at a distance that is less than about 2 centimeters from one another (plus or minus 10%). Additionally, the beams can be parallel to within a particular angle, for example, less than or equal to 10 milliradians (plus or minus 10%).

Exemplary Electro-Magnetic (e.g., Light) Source

Exemplary electro-magnetic source 135 shown in FIG. 1 can be used to illuminate the sample for imaging or spectroscopy. Exemplary electro-magnetic source 135 can be any suitable source of collimated electro-magnetic radiation (e.g., including but not limited to light). The exemplary light can be visible light or light in the infrared wavelengths. For example, the electro-magnetic source can be or include a laser, providing either single-color "continuous wave" or broadband pulsed radiation, or a high temperature black-body source providing broadband radiation. Additionally, exemplary electro-magnetic source 135 can be a synchrotron. The beam-waist (e.g., diameter) of emitted radiation can be about 0.5 cm (plus or minus 10%). However, diameters as large as about 3 cm can be used (plus or minus 10%).

Exemplary Beam-Splitter

Exemplary beam splitter 120 shown in FIG. 1 can be used to divide or otherwise separate the probe radiation into two beams. The two beams can be used to illuminate the sample and to serve as an intensity- and phase-referencing beam for interferometric detection of light that has interacted with the sample. A 50%-50% beam-splitter can be used, which can be composed of a material suitable for the energy of illumination being used. Dichroic (e.g., visible radiation), or ZnSe/silicon (e.g., infrared radiation) can be used. The diameter of exemplary beam splitter 120 can match that of the incoming beam from the light source.

Exemplary Retro-Reflector

Exemplary retro-reflector 125 (e.g., reference arm retro-reflector) shown in FIG. 1 can be used to phase-modulate the reference beam before retro-reflecting the light in an orientation suitable for delivery to the microscope/sample. Phase modulation can be performed using physical translation of the optic along its axis, either with a piezoelectric actuator or another suitable high-precision linear translator. Perfect, or near-perfect, retro-reflection can be beneficial to yield pure phase modulation without any other displacement or distortion of the reference beam. Exemplary retro-reflector 125 can be used to phase modulate the reference beam along an axis that can be perfectly, or near-perfectly, aligned to the direction of the incoming and outgoing radiation. Thus, only the phase of the radiation can be modulated while its path through space can remain unchanged.

Exemplary Measurement Chamber/Microscope Unit

For example, as illustrated in FIG. 1 with reference to FIG. 6, the sample can be placed in measurement chamber/isolation platform 110, along with at least a single specialized dual-function objective 130. Exemplary measurement chamber/isolation platform 110 and/or microscope does not need to be mechanically fixed or proximate to any of the other elements in the apparatus. Exemplary measurement chamber/isolation platform 110, in combination with dual-function objective 130 and scanning probe 105, can be an arbitrary distance from the other elements in the exemplary apparatus, does not need to be mechanically fixed to the other elements in the apparatus. Exemplary measurement chamber/isolation platform 110 can be and/or include an ultra-high vacuum chamber, facilitating complete thermal and environmental control over the sample. The environmental control hardware can introduce vibrations or other mechanical perturbations, and dual-function objective 130 and scanning probe 105 can be mechanically isolated from these disturbances. Exemplary measurement chamber/isolation platform 110 can include active or passive mechanical isolation hardware to "protect" dual-function objective 130 and scanning probe 105 from these disturbances, or dual-function objective 130, scanning probe 105 and measurement chamber/isolation platform 110 can also be so mechanically isolated together.

Exemplary Dual-Function Objective

Exemplary dual-function objective 130 shown in FIG. 1 can be used to deliver the illumination radiation in a focused or otherwise modified form to the sample, and retro-reflect the reference radiation beam back towards detector 140 and measurement chamber/isolation platform 110. The retro-reflecting surface can be aligned as perfectly as possible, for example, less than about a 5 mrad misalignment (plus or minus 10%) to the optical axis of the objective's focal function. Exemplary dual-function objective 130 can collect reflected or back-scattered radiation that has interacted with the sample as a collimated beam and deliver it back to detector 140. Exemplary dual-function objective 130 can protect the sampling and reference beams from any "uncommon" phase or amplitude distortion that can arise from, for example, mechanical instabilities of the measurement environment. The aperture size for the retro-reflecting surface for the incoming reference radiation can match the diameter of the radiation. The aperture size for the focal surface of dual-function objective 130 can also match the incoming illumination radiation. These aperture diameters can be circular, with diameters as small as 0.5 cm (plus or minus 10%) or as large as 3 cm (plus or minus 10%).

Exemplary Scanning Probe

Exemplary scanning probe 105 shown in FIG. 1 can be incorporated into exemplary measurement chamber/isolation platform 110. Exemplary scanning probe 105 can include a scanning probe together with a holder for the sample than can facilitate its accurate positioning and raster-scanning on micrometer and nanometer scales. Exemplary scanning probe 105 can be physically compact, for example, less than about 20 cm (plus or minus 10%) and mechanically rigid. Exemplary scanning probe 105 can be mechanically fixed to Dual-Function Objective 130.

Exemplary Detector

Exemplary detector 140 shown in FIG. 1 can be used to interferometrically detect radiation that has interacted with the sample, which can be because sampling and reference radiations can be recombined by beam-splitter 120 before being delivered to detector 140. Exemplary detector 140 can be a photodiode (e.g., for visible or infrared radiation), a photoconductive element or bolometer (e.g., for infrared radiation, as in our ideal embodiment), or a charge-coupled device ("CCD") or a focal plane array to facilitate holographic imaging of light that has interacted with the sample.

Figure 10:
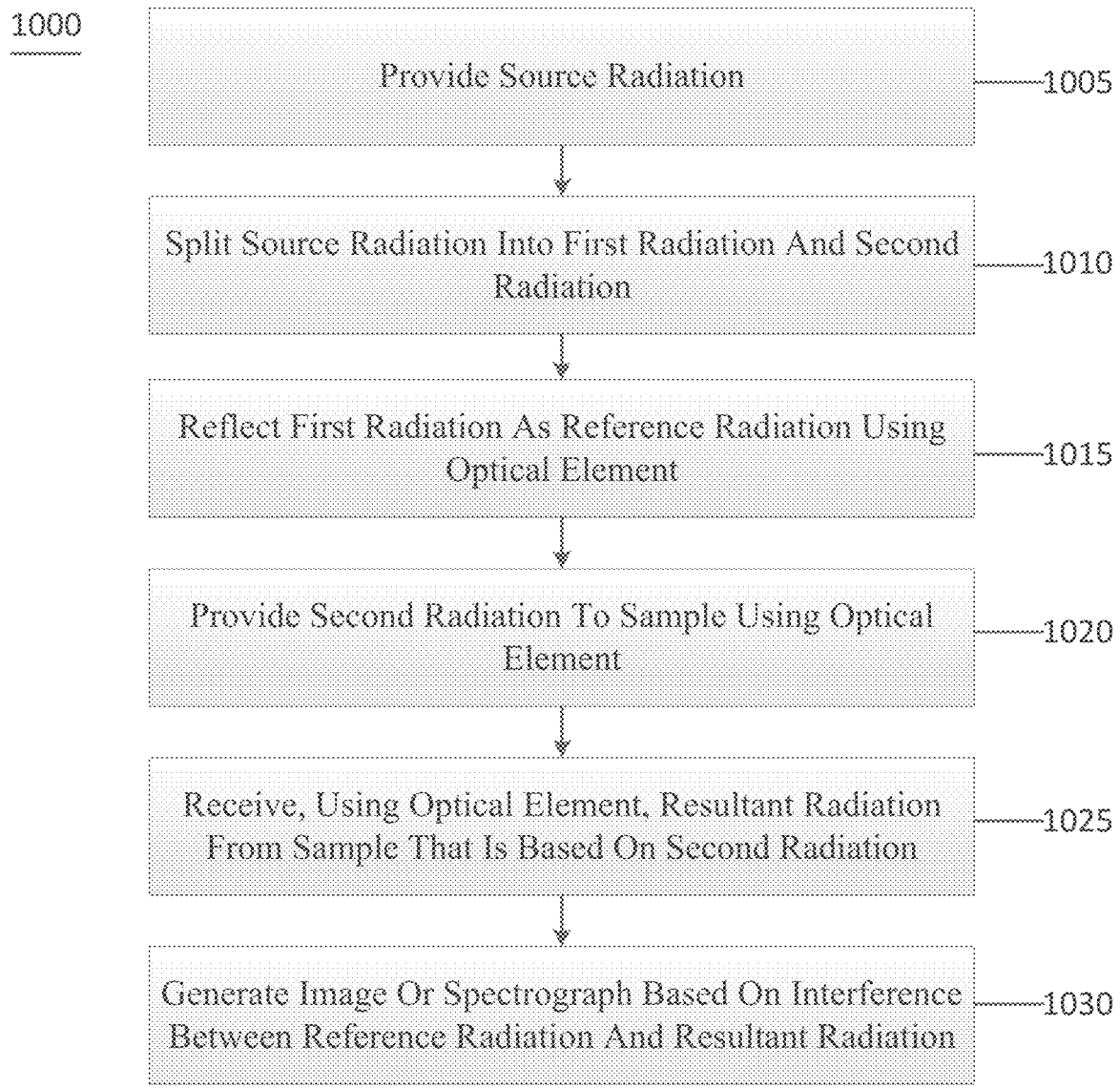
FIG. 10 is a flow diagram of an exemplary method for generating at least one image of a sample according to an exemplary embodiment of the present disclosure.

FIG. 10 illustrates a flow diagram of an exemplary method 1000 for generating at least one image and/or spectrograph of a sample according to an exemplary embodiment of the present disclosure. For example, at procedure 1005 a source radiation can be provided. At procedure 1010, the source radiation can be split into a first radiation and a second radiation (e.g., by a beam splitter). At procedure 1015, the first radiation can be reflected as a reference radiation using an optical element (e.g., one or more mirrors, RSOD, etc.). At procedure 1020, the second radiation can be provided to the sample using the optical element and/or another configuration. At procedure 1025, a resultant radiation from the sample that is based on the second radiation can be received using the optical element and/or another configuration. At procedure 1030, the image or spectrograph can be generated based on an interference between the reference radiation and the resultant radiation.

Figure 11:
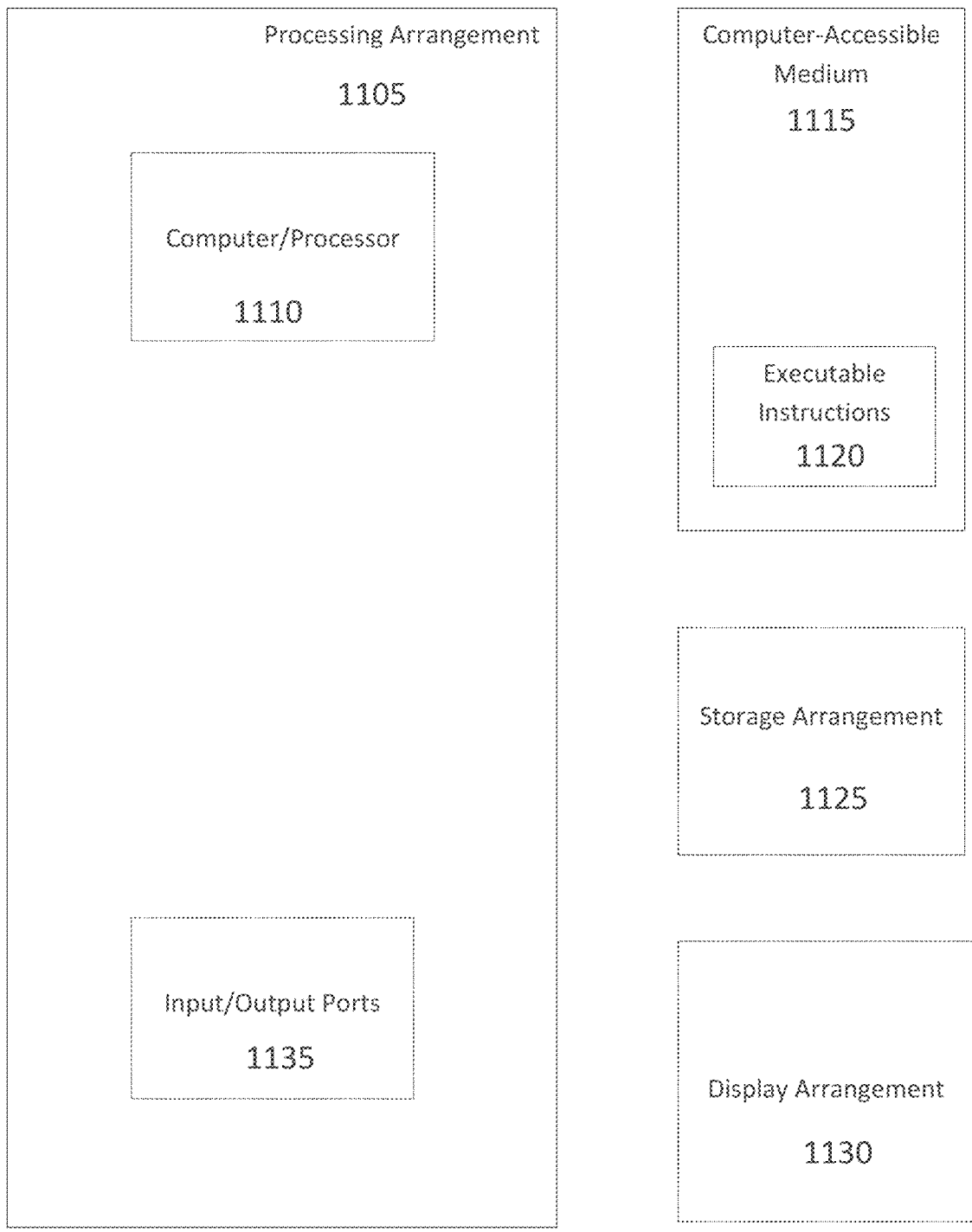
FIG. 11 is an illustration of an exemplary block diagram of an exemplary system in accordance with certain exemplary embodiments of the present disclosure.

FIG. 11 shows a block diagram of an exemplary embodiment of a system according to the present disclosure, which can be used to control the exemplary interferometry apparatus, and/or can be used to generate an image using light received from the exemplary interferometry apparatus. For example, the exemplary interferometry apparatus can be controlled, or an image can be generated by a processing arrangement and/or a computing arrangement 1105. Such processing/computing arrangement 1105 can be, for example entirely or a part of, or include, but not limited to, a computer/processor 1110 that can include, for example one or more microprocessors, and use instructions stored on a computer-accessible medium (e.g., RAM, ROM, hard drive, or other storage device).

As shown in FIG. 11, for example a computer-accessible medium 1115 (e.g., as described herein above, a storage device such as a hard disk, floppy disk, memory stick, CD-ROM, RAM, ROM, etc., or a collection thereof) can be provided (e.g., in communication with the processing arrangement 1105). The computer-accessible medium 1115 can contain executable instructions 1120 thereon. In addition, or alternatively, a storage arrangement 1125 can be provided separately from the computer-accessible medium 1115, which can provide the instructions to the processing arrangement 1105 to configure the processing arrangement to execute certain exemplary procedures, processes and methods, as described herein above, for example.

Further, the exemplary processing arrangement 1105 can be provided with or include an input/output arrangement or input output ports 1135, which can include, for example a wired network, a wireless network, the internet, an intranet, a data collection probe, a sensor, etc. As shown in FIG. 11, the exemplary processing arrangement 1105 can be in communication with an exemplary display arrangement 1130, which, according to certain exemplary embodiments of the present disclosure, can be a touch-screen configured for inputting information to the processing arrangement in addition to outputting information from the processing arrangement, for example. Further, the exemplary display 1130 and/or a storage arrangement 1125 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCE

The following reference is hereby incorporated by reference in its entirety.

[1] Ocelic, N., Huber, A. & Hillenbrand, R. "Pseudoheterodyne detection for background-free near-field spectroscopy." *Appl. Phys. Lett.* 89, (2006).

[2] Post, K. W., McLeod, A. S., Hepting, M. et al. Coexisting first- and second-order electronic phase transitions in a correlated oxide. *Nature Phys* 14, 1056-1061 (2018) doi: 10.1038/s41567-018-0201-1.

What is claimed is:

1. An apparatus for providing radiation to at least one sample, comprising:
a radiation source arrangement configured to provide a radiation;
a beam splitter configured to split the radiation into (i) a first radiation, and (ii) a second radiation; and
an optical element which, in operation:
receives the first radiation and the second radiation,
reflects the first radiation as a reference radiation,
provides the second radiation as illumination for the at least one sample,
receives a resultant radiation from the at least one sample that is based on the illumination from the second radiation, and
provides the reference radiation and the resultant radiation to be detected and used for at least one of interferometric imaging or spectroscopy.

2. The apparatus of claim 1, further comprising a variable path length retro-reflector configured to:
receive the first radiation,
vary the optical phase of the first radiation; and
provide the first radiation to the optical element.

3. The apparatus of claim 1, wherein the optical element includes an objective lens.

4. The apparatus of claim 1, wherein the optical element includes a concave focusing mirror.

5. The apparatus of claim 1, wherein the first and second radiations are delivered collinearly at a distance that is less than about 2 centimeters from one another when the first radiation and the second radiation reach the optical element.

6. The apparatus of claim 1, wherein the beam splitter and the optical element are provided at a distance that is less than about 5 feet apart from one another.

7. The apparatus of claim 1, wherein the optical element has (i) a diameter focal aperture of about 1 cm and (ii) a diameter reference aperture of about 1 cm.

8. The apparatus of claim 1, further comprising at least one radiation detector configured to receive the reference radiation and the resultant radiation as an interfered radiation, and generate at least one of at least one image or at least one spectrograph based on the interfered radiation.

9. The apparatus of claim 8, wherein the at least one radiation detector is configured to register the second radiation at a time constant of about 60 ms.

10. The apparatus of claim 1, further comprising an optical chopper configured to modulate the second radiation.

11. The apparatus of claim 10, wherein the optical chopper is configured to modulate the second radiation at a speed of at least 200 Hz.

12. The apparatus of claim 1, further comprising a scanning probe, wherein the optical element is located on or in the scanning probe.

13. The apparatus of claim 1, wherein the optical element includes a dual-function objective.

14. The apparatus of claim 13, wherein the dual-function objective includes a gold-coated off-axis parabolic mirror.

15. The apparatus of claim 1, further comprising a measurement chamber, wherein the optical element is mounted on or in the measurement chamber.

16. The apparatus of claim 1, further comprising an isolation platform, wherein the optical element is mounted on or in the isolation platform.

17. The apparatus of claim 16, wherein the isolation platform is suspended from a further platform using a plurality of springs.

18. The apparatus of claim 1, wherein the apparatus is mechanically fixed to an optical table supported by at least four vibration isolation legs.

19. The apparatus of claim 18, wherein the vibration isolation legs are pneumatic vibration isolation legs.

20. A method for generating at least one image of at least one sample, comprising:
   (a) providing a source radiation;
   (b) splitting the source radiation into a first radiation and a second radiation;
   (c) reflecting, by an optical element, the first radiation as a reference radiation;
   (d) providing, by the optical element, the second radiation to the at least one sample;
   (e) receiving, by the optical element, a resultant radiation from the at least one sample that is based on the second radiation; and
   (f) generating the at least one image or spectrograph based on an interference between the reference radiation and the resultant radiation.

21. The method of claim 20, wherein the first and second radiations are delivered collinearly at a distance that is less than about 2 centimeters from one another when the first radiation and the second radiation reach the optical element.

22. The method of claim 20, wherein the beam splitter and the optical element are provided at a distance that is less than about 5 feet apart from one another.

23. The method of claim 20, further comprising an optical chopper configured to modulate the second radiation.

24. The method of claim 20, wherein an isolation platform is provided on or in which the optical element is mounted.

25. The apparatus of claim 1, wherein the apparatus is mechanically fixed to an optical table supported by at least four vibration isolation legs.

* * * * *